United States Patent [19]

Carpenter et al.

[11] 4,111,294
[45] Sep. 5, 1978

[54] ALIGNMENT PLATE CONSTRUCTION FOR ELECTROSTATIC PARTICLE ORIENTATION

[75] Inventors: C. Thomas Carpenter; Norman W. Stunkard, both of Lake Oswego, Oreg.

[73] Assignee: Voltage Systems, Inc., Lake Oswego, Oreg.

[21] Appl. No.: 790,007

[22] Filed: Apr. 22, 1977

Related U.S. Application Data

[63] Continuation-in-part of Ser. No. 674,974, Apr. 8, 1976, abandoned.

[51] Int. Cl.² .............................................. B65G 47/24
[52] U.S. Cl. ...................................... 198/381; 264/24; 156/62.2; 425/83.1; 425/3; 425/224
[58] Field of Search ............... 264/24, 108; 198/381, 198/382, 396, 540, 547, 550, 557, 562, 541, 553, 565, 616; 193/25 R, 25 A; 425/3, 80.1, 83.1, 110, 130, 223, 224; 427/26, 47; 156/62.2

[56] References Cited

U.S. PATENT DOCUMENTS

| 823,955 | 6/1906 | Meredith | 198/540 |
|---|---|---|---|
| 1,373,812 | 4/1921 | Heath | 198/382 |
| 1,375,988 | 4/1921 | Walker | 198/565 |
| 2,505,927 | 5/1950 | Woodring | 198/565 |
| 3,399,466 | 9/1968 | Hartley | 198/616 |
| 3,714,700 | 2/1973 | Ehrenfellner | 198/382 |
| 3,843,756 | 10/1974 | Talbott et al. | 264/24 |
| 3,896,536 | 7/1975 | Keller et al. | 198/382 |
| 3,963,400 | 6/1976 | Urmanov | 425/224 |

FOREIGN PATENT DOCUMENTS

816,285  7/1959  United Kingdom ..................... 264/24

Primary Examiner—Joseph E. Valenza
Attorney, Agent, or Firm—Kolisch, Hartwell, Dickinson & Stuart

[57] ABSTRACT

Alignment plate construction for use in electrostatically aligning particles for particleboard production includes a plate of conductive material to which is secured flexible, controlled resistive material. In a bank of successively positioned plates, particles which are permitted to pass downwardly between the plates are unidirectionally aligned, and the flexible material ensures that the electric field lines between the plates remain substantially horizontal over the entire plate and material height so that field line distortion does not occur adjacent a mat being formed beneath the plates. Because the flexible material is of controlled resistance, voltage grading occurs across its height and arc over between the plates and a conductive caul plate is thereby prevented.

17 Claims, 15 Drawing Figures

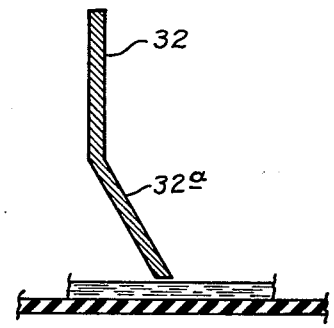 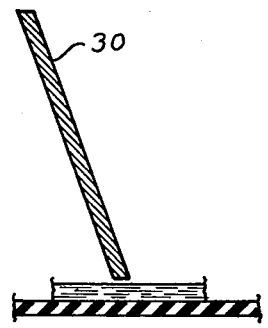 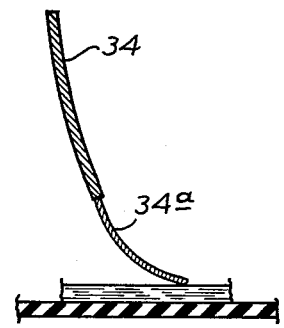
Fig. 5a.  Fig. 5.  Fig. 5b.
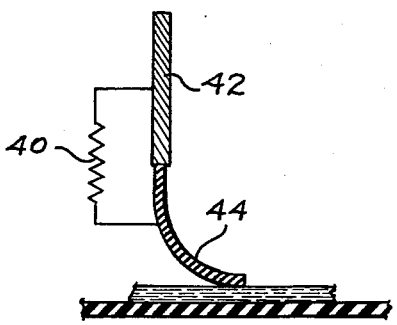
Fig. 7.
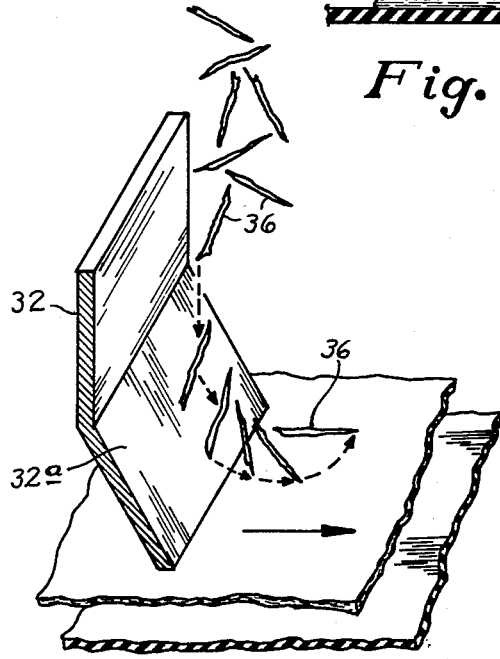
Fig. 6.
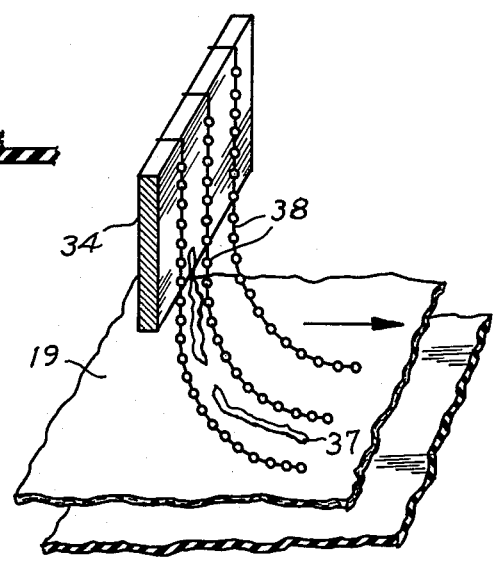
Fig. 4.

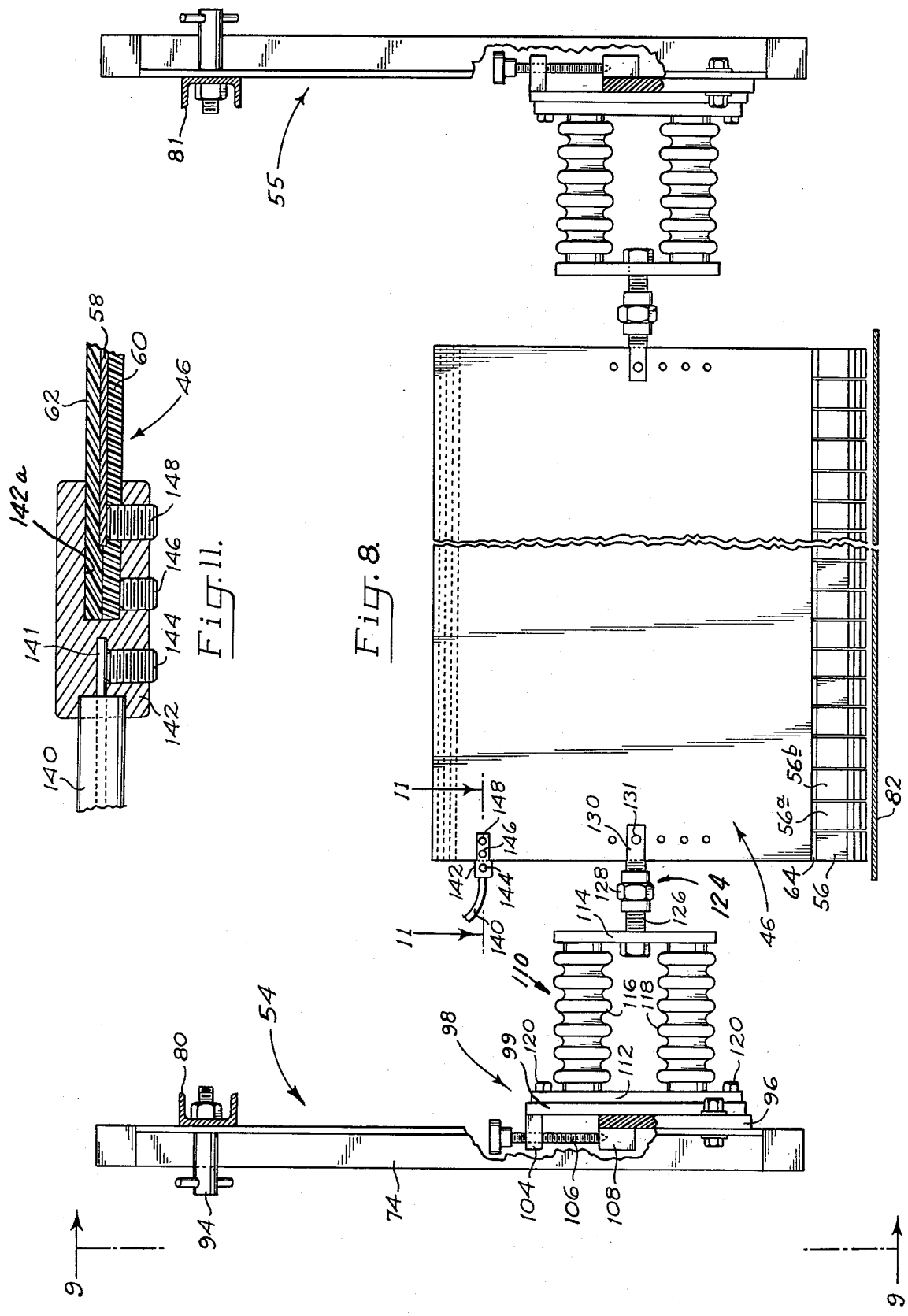

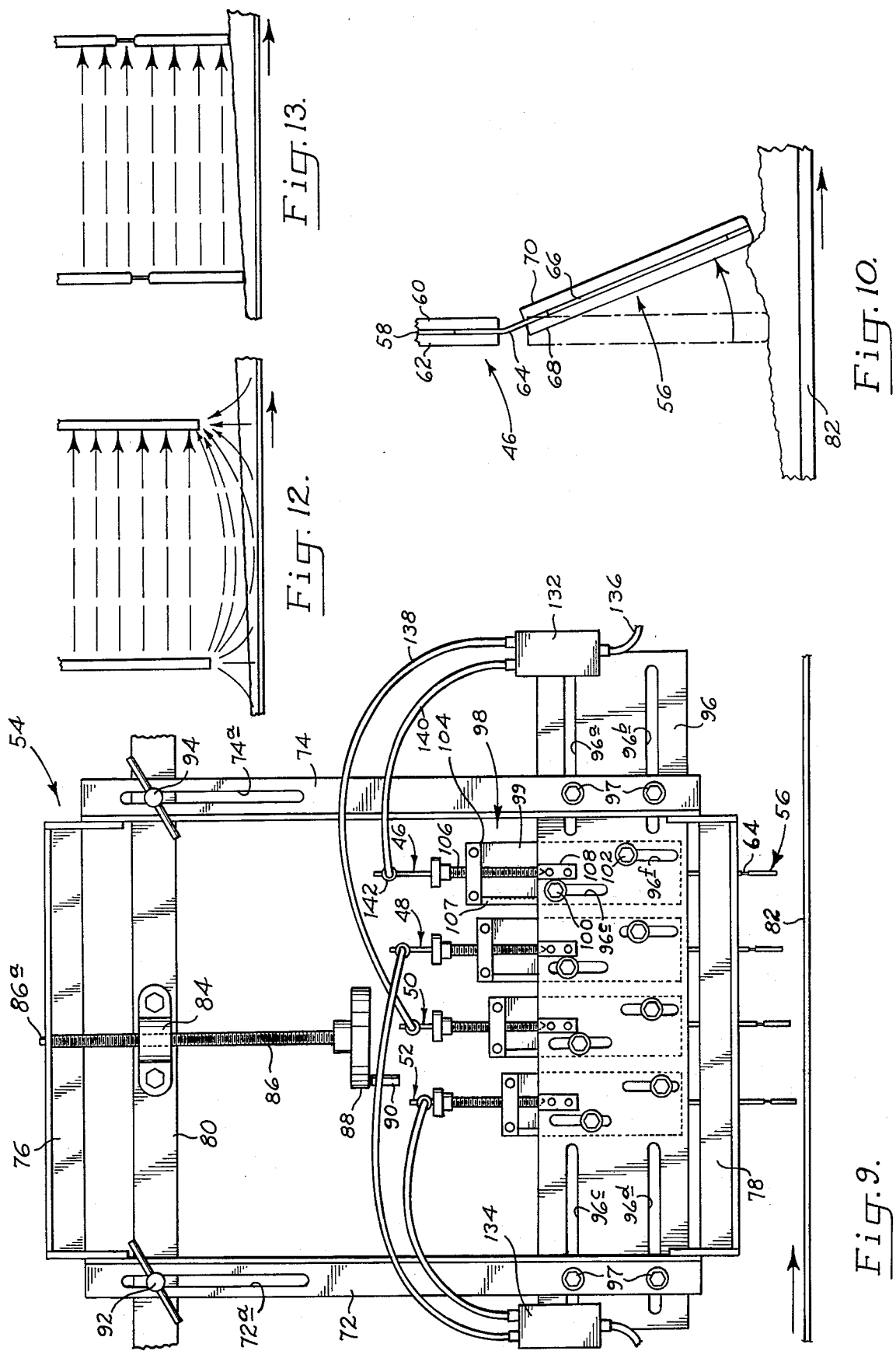

ALIGNMENT PLATE CONSTRUCTION FOR ELECTROSTATIC PARTICLE ORIENTATION

CROSS-REFERENCE TO RELATED APPLICATION

This application is a continuation-in-part of applicants' copending application Ser. No. 674,974 filed on Apr. 8, 1976 now abandoned.

BACKGROUND OF THE INVENTION

A. Field of the Invention

The present invention relates to electrostatic devices used to align particles unidirectionally in particleboard manufacture. More particularly, the present invention is directed to an improved electrostatic plate construction which ensures that the electric field lines between adjacent charged plates will remain substantially horizontal and undistorted adjacent to the surface of a particleboard mat being formed.

Electrostatic orientation units generally comprise a plurality of upright electrically charged plates arranged over a traveling conveying system. In order to produce fiberboard or particleboard, fibers or particles are dispersed from a hopper or the like so that they pass downwardly between the charged plates. The fibers or particles are then aligned between the plates, due to electrostatic forces, and fall to the conveying system so that a mat of fiberboard or particleboard is produced. However, several problems exist with known orientation units. For instance, assuming an orientation unit which utilizes DC current for positively and negatively charging alternate plates, it can be appreciated that the electric field existing between adjacent plates becomes distorted adjacent the mat being formed. Because the electrostatically charged plates must have their bottom edges disposed higher than the mat being formed, particles which have fallen between such plates will not experience the aligning electrostatic force in the area between the top of the mat and the bottom edges of the electrostatic plates. Consequently, a good portion of the particles may not be unidirectionally aligned in the formed particleboard.

It is important that unidirectional alignment occur because random alignment does not provide the strength and stability in the longitudinal direction which is important for particleboard used in roof sheathing, flooring, siding, shelving, plywood cores, etc.

Because of substantial waste in the lumber products industry, it is desirable to provide an orientation unit functional to align relatively large particles. For instance, in the production of plywood, of every 100 pounds of logs, only approximately 40% actually becomes finished plywood. The remaining bark, chips and core may be totally wasted. Bark and wood chips may, however, be effectively used to produce particleboard. Additionally, other materials such as rice hulls, straw, etc., if properly aligned unidirectionally, may be readily used to produce particleboard having substantial strength and stability for use in a variety of applications.

B. Description of the Prior Art

Prior art orientation units have recognized that an electric field adjacent the bottom portion of charged alignment plates may be distorted thereby resulting in misalignment of particles or fibers. For instance, in U.S. Pat. No. 3,843,756, there is disclosed a method for forming boards from particles in which AC current is used to align the particles. Alternate electrode plates are arranged in a series and are charged with opposite polarity from an AC high voltage source. Furthermore, there are secondary electrode plates arranged below the traveling mat which is formed. The secondary electrode plates are used to shape the electric field so that such field is more nearly horizontal in the space just below the bottom of the electrode plates where the mat is being formed. However, it may be readily appreciated that the bottom edges of the primary electrode plates must be arranged in an increasing step construction in the direction of the travel of the mat so that the formed mat will not be gouged or disturbed by the bottom edge of the plates.

DC orientation units have been proposed in which separate groups of aligned orientation plates are staggered one from another in order to compensate for the increasing slope of a mat being formed. Such a construction is somewhat impractical from a cost and construction standpoint.

SUMMARY OF THE INVENTION

The present invention provides a novel alignment plate construction for use in either AC or DC particle orientation units used to align particles for particleboard manufacture. The present invention contemplates a particle orientation unit which incorporates a plurality of electrostatically charged parallel plates each of which includes controlled resistive material depending from a bottom portion of the plate for flexibly contacting a mat being formed. The flexible material will permit the moving mat to slide thereby without gouging or penetrating the mat. By using such a controlled resistive material, the electric field lines between the plate will remain substantially horizontal adjacent the top surface of the mat being formed.

In accordance with the present invention, it is a general object to provide an electrostatic plate construction for use in orientation units which maintains the electric field between adjacent electrostatically charged plates substantially horizontal from the top of the plates to a region adjacent to a mat being formed.

Another object of the present invention is to provide an orientation unit in which electrostatically charged plates provide the major force resulting in particle alignment, but wherein the controlled resistive material also mechanically aids in aligning the particles by providing a surface over which the particles may slide so that one end of the particle may first contact the moving mat while the other end is retained on the flexible material. The first end will thereby be pulled in the direction of movement of the mat to align the particle.

In another embodiment of the present invention, it is an object to slope or slant the electrostatically charged plates so that mechanical as well as electrostatic alignment can be effectuated.

Still another object of the present invention is to provide an orientation unit having alignment plates which includes flexible controlled resistive material which permits substantial voltages to be applied between the plates without arc over occurring.

Yet a further object of the invention is to provide controlled resistive material depending from electrostatically charged plates which material enables the use of a conductive caul plate.

In another embodiment of the invention, it is an object to provide flexible controlled resistive material which is attached to an associated electrostatically charged plate adjacent a top portion of the plate so that particles passing downwardly between adjacent plates will be mechanically oriented between lengths of the material.

These and other objects of the present invention will become more readily apparent from a consideration of the following drawings taken together with the detailed description.

BRIEF DESCRIPTION OF THE DRAWINGS

Novel features of the improved electrostatic alignment plates for use in an orientation unit for producing particleboard in accordance with the present invention will be more readily understood from a consideration of the following description taken together with the accompanying drawings in which certain preferred adaptations are illustrated with the various parts thereof identified by suitable reference characters in each of the views, and in which:

FIG. 2 is a side view of only two electrostatically charged plates having control resistive material flexibly secured adjacent their bottoms in accordance with the present invention illustrating how a mass of particles dumped between the plates is aligned;

FIG. 4 is another embodiment of the present invention illustrating the use of strips of controlled resistive material rather than an entire sheet for use in maintaining the electric field between electric plates substantially horizontal;

FIGS. 5, 5a and 5b illustrate various nonvertical constructions of electrostatically charged alignment plates which permit particles to fall onto the plates and be mechanical aligned;

FIG. 6 is a perspective view of FIG. 5a illustrating how a particle can contact a lower ledge of an inclined electrostatically charged plate and be aligned by having a first end of the particle contact a moving mat such that the particle is swung into alignment;

FIG. 7 is a side view of an alignment plate illustrating the use of a grading resistor between the plate and the flexible resistive material.

FIG. 8 is a front elevational view, broken along its length, of another embodiment of the present invention illustrating connection of alignment plates to a mounting assembly;

FIG. 9 is a view taken along lines 9—9 of FIG. 8 and is a side elevational view of the mounting assembly;

FIG. 10 is a partial, enlarged view of the bottom portion of a plate construction used in the embodiment shown in FIGS. 8 and 9;

FIG. 11 is a cross-sectional view taken along lines 11—11 of FIG. 8 and shows the interconnection between an individual alignment plate and an electrical lead;

FIG. 12 is a view similar to FIG. 1 and illustrates distortion of electric field lines between adjacent charged plates; and FIG. 13 is a view illustrating parallel electric field lines which result when alignment plates are provided with resistive material depending from their bottom edges as shown in FIGS. 8, 9 and 10.

DETAILED DESCRIPTION OF THE INVENTION

The following detailed description is directed to a novel plate construction for use in electrostatic orientation units. Accordingly, only essential features of the plate constructions are illustrated. However, it is to be understood that electrostatic orientation units operate under the principle that fibers or particles act as dipoles when dropped between charged plates. Such fibers or particles tend to align in the direction of the electric field between the plates. Such alignment teachniques are used in the production of fiberboard and particleboard.

Figure 1:
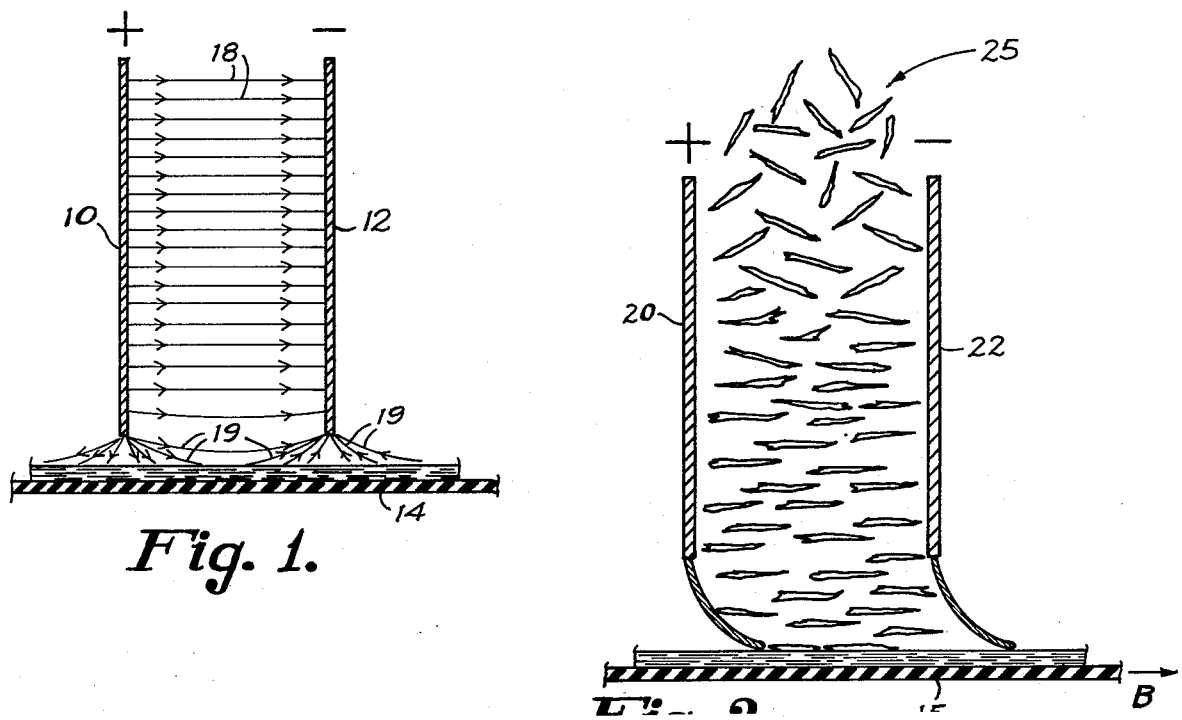
FIG. 1 is a side view of two electrostatically charged alignment plates of an orientation unit illustrating the electric field existing between the plates and the corresponding distortion of the field adjacent to a mat traveling therebeneath.

Turning now to the drawings, in FIG. 1 there is shown a side view of a pair of electrostatically charged alignment plates of an orientation unit. Only two oppositely charged plates are shown, i.e., alignment plates 10 and 12 are disposed above a caul plate 14 which moves in the direction of arrow A. It is to be understood that the plates 10, 12 are charged by an appropriate high voltage system (not shown). Furthermore, the source for introducing particles between the plates is not shown nor is the system for driving the caul plate. A mat 16 is being formed on the moving caul plate 14. As shown in FIG. 1, electric field lines 18 between plates 10, 12 are generally horizontal and extend from the alignment plate 10 to the alignment plate 12. The electric field lines 18 exert forces on particles which pass downwardly from a hopper or pickeroll or the like (not shown) down between the alignment plates 10 and 12.

While only two plates are shown, it is to be remembered that other charged alignment plates are arranged on either side of plates 10 and 12 in an orientation unit. Because of the presence of other alignment plates, and because of moisture in the mat material and the presence of other conductors, the electric field lines at the bottom region of plates 10 and 12 are somewhat distorted and nonhorizontal as illustrated. The distorted electric field lines 19 will not align particles free falling between the plates as do the electric field lines 18. Consequently, such particles will not be unidirectionally aligned on the mat 16. It is, of course, possible to situate alignment plates 10 and 12 closer to the top of particleboard mat 16 so that the horizontal electric field lines will not be so distorted adjacent the top surface of the mat. However, it is to be remembered that as a mat proceeds in the direction of arrow A, such mat is constantly gaining in thickness and hence if an alignment plate was placed too close to a mat, the alignment plate could gouge or score the surface.

Figure 3:
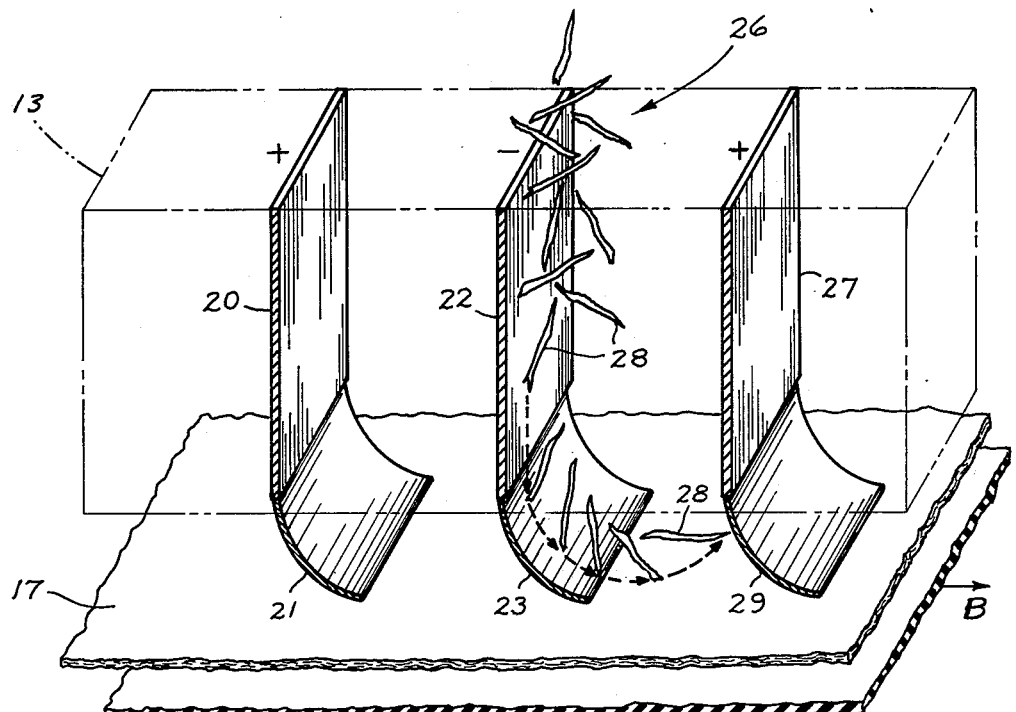
FIG. 3 is a perspective view of a portion of an orientation unit showing several electrostatically charged plates and how the flexible material attached to the plates is effective to mechanically aid in the alignment of a particle.

With consideration now directed to FIGS. 2 and 3, specific features of a first embodiment of the present invention may be more readily appreciated. Three alignment plates 20, 22 and 27 of an orientation unit are illustrated having attached thereto flexible controlled resistive sheets or curtains, 21, 23 and 29, respectively. As can be seen, as caul plate 15 moves in the direction of arrow B, the flexible sheets ride over mat 17 and do not gouge or score the mat. Thus, the mat may increase in thickness without resulting damage.

The flexible resistive sheets 21, 23 and 27 actually form continuous curtains as shown in FIG. 3. These curtains serve as a voltage gradient so that the voltage applied to the plates 20, 22, 27, actually decreases in intensity near the mat 17. However, it may be readily appreciated that the electric field lines between the curtains 21, 23, 27, are substantially horizontal and significant distortion does not occur as would be the case with the plates shown in FIG. 1. Consequently, as a mass of particles 25 is allowed to free fall between the plates such particles become aligned between the plates and also adjacent the top surface of a mat being formed as shown in FIG. 2 because the electric field lines are maintained substantially horizontally.

An additional advantage in using a flexible material attached to the bottom of the plates 20, 22 and 27 resides in the fact that mechanical orientation of the particles may also be effectuated. For instance, as shown in FIG. 3, a portion 26 of a mass of chips is illustrated falling between the plates 22 and 27. While some chips, due to excessive size, etc., may not become aligned due to the electric field between the plates, mechanical alignment may nevertheless occur. Specifically, with reference to particle 28, such particle is successively shown falling between plates 22, 27 and contacting flexible material 23. Particle 28 then slides down material 23 until a front end of the particle contacts moving mat 17. The particle's front end will be grabbed by the mat while the opposite end of the particle will tend to cling to the flexible material 23 because of the static charge. Consequently, the particle will tend to be rotated into alignment for disposal on the mat aligned in the direction of mat travel as shown in FIG. 3. A supporting structure 13 is shown in dot-dash to which the plates are secured.

Additional embodiments of the present invention are shown in FIGS. 5, 5a, 5b and 6. Each of these figures illustrates only a single alignment plate. However, each of the plates would be employed in a bank of like plates in an orientation unit. Each of the plates has at least a portion of its height disposed at an angle with respect to a caul plate and a mat being formed. For instance, in FIG. 5, an alignment plate 30 is shown completely tilted with respect to a caul plate and mat. FIG. 5a illustrates an alignment plate 32 which has a lower portion 32a inclined with respect to a caul plate and mat. FIG. 5b illustrates a curved alignment plate 34. The above referenced alignment plates provide for mechanical orientation of a portion of the mass of chips dropped between adjacent plates. As shown in FIG. 6, a chip 36 which is not electrostatically aligned, may nevertheless experience mechanical alignment by sliding down inclined portion 32a to the mat where it is pivoted into alignment.

Another embodiment of the present invention is illustrated in FIG. 4 wherein elongate strips 38 of controlled resistive material are hung from an alignment plate 34. The strips 38 are flexible so that they will ride on mat 19 without damaging it. The controlled resistive strips 38 ensure that a substantially horizontal electric field is maintained adjacent to the top surface of mat 19. In addition, the strips 38 may also mechanically align particles falling between adjacent plates which are not electrostatically aligned. As an example, a particle may contact the strips 38 and fall between them such that a particle will have its longitudinal axis maintained substantially parallel to the strips 38. A particle 37 is shown aligned between strips 38 during its downward passing.

It is also to be noted that the inclined plates shown in FIGS. 5, 5a, and 5b could be provided with flexible curtains. FIG. 5b illustrates plate 34 having a flexible curtain 34a secured thereto. Additionally, if it were desired to control the voltage on the curtains, appropriate resistance could be supplied between a plate and the curtain such that a voltage drop would occur. In this manner, selective voltage grading could be maintained across the curtains.

As shown in FIG. 7, a grading resistor 40 is connected between alignment plate 42 and flexible resistive material 44. The resistor 40 serves to grade the voltage from the plate 42 to the material 44. Such controlled grading may prevent short circuit conditions from developing between a steel caul plate and the flexible resistive material. Additionally, it is to be noted that alignment plate construction could take the form of a plurality of vertically disposed conductive plates interconnected by a resistor. A bank of horizontally spaced plates according to this construction would provide an alternate form of an orientation unit.

Another embodiment of the present invention is shown in FIGS. 8, 9 and 10. This embodiment relates to an alignment plate construction in which segments of rigid resistive material are hingedly or movably connected to the bottom of an alignment plate. For instance, as shown in FIGS. 8 and 9, a plurality of vertically disposed alignment plates 46, 48, 50 and 52 are supported in opposed mounting assemblies generally designated at 54 and 55. Plate 46 is provided with a plurality of hingedly connected segments 56, 56a, 56b, etc such, of which is movable relative to the plate. Each of the other alignment plates is similarly provided with hinged segments.

As shown in FIG. 10, each alignment plate such as plate 46 includes an expanse 58 of conductive material sandwiched between expanses 60, 62 of resistive material. Appropriate adhesive is used to secure expanses 60, 62 to expanse 58. As shown in FIG. 10, a space is provided between the bottom of expanse 58 and the bottom of expanses 60, 62. Appropriately adhered within this space for contact with expanse 58 is a piece of flexible resistive material 64 such as conductive rubber which extends beneath the bottom of expanses 60, 62. Each of segments 56, 56a, etc. includes a core 66 of conductive material sandwiched between layers 68, 70 of rigid resistive material. It can be seen that flexible material 64 serves to hingedly or movably interconnect segment 56 to plate 46 so that segment 56 may swing or move relative to the plate. Similarly, segments 56a, 56b, etc. are hingedly interconnected to plate 46. Likewise, plates 48, 50, etc. are provided with a plurality of hingedly interconnected segments which extend along the length of the plate adjacent to its bottom edge.

With attention now redirected to FIGS. 8 and 9, details of mounting assembly 54 will be described. Details of mounting assembly 55 are substantially similar. Mounting assembly 54 includes a pair of opposed bracket arm 72, 74 which are interconnected by cross members 76, 78 to provide a rigid structure. Arms 72, 74 include elongate slots 72a, 74a, respectively, which extend in the longitudinal direction of the arms.

Mounting assemblies 54, 55 are contemplated for mounting on an existing particleboard forming head above a conveyor or caul plate. To this end, arms 72, 74 are mounted to a frame member 80 of an existing forming head above a caul plate 82. Another frame member is shown at 81. As shown in FIG. 9, frame member 80 is provided with a nut assembly 84 through which extends an elongate threaded shaft 86. Threaded shaft 86 is provided with an extension 86a which extends through an aperture provided in a flanged portion of member 76.

A rotatable wheel 88 is rigidly connected to shaft 86 and includes a crank handle 90.

Frame member 80 is also provided with bores which accommodate insertion of bolts connected to socket wrenches 92, 94. Thus, it can be seen that movement of frame assembly 54 relative to caul plate 82 may be effectuated by selectively rotating shaft 86 in nut assembly 84. Tightening of wrenches 92, 94 will tighten their respective bolts and rigidly secure mounting assembly 54 to frame member 80.

A horizontally adjustable plate 96 includes opposed pairs of horizontally positioned elongated slots 96a, 96b and 96c, 96d. Bolts 97 are inserted through appropriate apertures in arms 72, 74 for insertion through the slots in adjustable plate 96. Upon loosening of the bolts, adjustable plate 96 may be selectively positioned in the horizontal direction.

Each of the alignment plates is connected to opposed adjusting means selectively operable for varying the vertical positioning of the alignment plate. Because each of the adjusting means is substantially similar, only one such adjusting means 98 will be described which supports one side of alignment plate 46. It is to be understood that a similar adjusting means is provided on the opposite end of plate 46 for securing the plate to mounting assembly 55.

As shown in FIGS. 8 and 9, a slidable plate 99 is connected to plate 96 by means of bolts 100, 102 which extend through vertical slots 96e, 96f provided on plate 96. Plate 99 is provided with a nut assembly 104 adjacent its top portion for receiving an elongate adjusting thumb screw 106. A member 108 is attached to plate 96 and includes a slight indentation which provides a seat for an end of screw 106. Thus, upon loosening of bolts 100, 102, it can be seen that plate 99 may be selectively adjusted in the vertical direction by appropriate rotational movement of screw 106. A scale 107 is provided for indicating the position of plate 99 relative to the top of plate 96.

Connected to a rear side of plate 98 is an insulating assembly generally designated at 110. Insulating assembly 110 includes opposed support plates 112, 114 of insulating material which are interconnected by ribbed insulating members 116, 118. Plate 112 is connected by bolts 120, 122 to plate 99. Further, plate 112 includes horizontally positioned elongate slots for receiving bolts 120, 122 which permit horizontal shifting of insulating assembly 110 relative to plate 99. A turnbuckle assembly generally indicated at 124 interconnects insulating assembly 110 and alignment plate 46. Turnbuckle assembly 124 includes a threaded bolt 126 which extends through plate 114 and is threadedly received in a dual-threaded nut 128. Opposite hand threads are provided on threaded member 130 which includes a bore extending therethrough for connection to plate 46. An allen head screw 131 or similar fastener extends through an aperture in member 134 for connection to plate 46. Thus, it can be appreciated that upon selective rotation of nut 128, plate 46 will be drawn toward or extended away from insulating assembly 110. A similar insulating assembly is provided to the right as shown in FIG. 8.

Returning to FIG. 9, it can be seen that junction boxes 132, 134 are mounted on plate 96. Each of the junction boxes receives current from a high voltage source (not shown) of specified polarity for electrostatically charging alternate plates with such polarity. For instance, junction box 132 includes a lead 136 extending from the high voltage source and is split into multiple leads 138, 140. Lead 138 is connected to plate 50 and provides, for instance, a positive polarity thereto while lead 140 provides a positive polarity to plate 46. Similarly, junction box 134 includes leads which provide opposite or negative polarities to plates 48, 52.

With reference directed to FIGS. 8 and 11, details of the connection between lead 140 and alignment plate 46 will be described. As shown in FIG. 11, a connector 142 of conductive material is provided with a slot 142a for receiving alignment plate 46. Additionally, connector 142 receives clamping screws 144, 146 and 148. A conductor 141 of lead 140 is inserted through a hole provided in connector 142 and is rigidly connected thereto by means of clamping screw 144. Clamping screw 146 rigidly holds plate 46 within slot 142a and clamping screw 148 contacts conductive material 58 to provide the necessary electrical contact. In similar fashion, the other leads are connected to their respective alignment plates.

With respect to mounting assemblies 54, 55, it can be appreciated that several distinct advantages are provided. For instance, these assemblies may be readily mounted onto existing frame members of a particleboard forming unit above a caul plate. Relatively minor modifications must be made to the frame members of such a forming unit in order to accommodate frame assemblies 54, 55. After assemblies 54, 55 have been mounted, adjustments in their relative positioning to a caul plate may be provided by selectively rotating a wheel assembly, such as wheel assembly 88 of frame assembly 54. Alignment plate spacing may be selectively adjusted and the distance of an alignment plate and its associated segments above a caul plate may also be readily adjusted by the thumb screws, such as thumb screw 106 previously described. In addition, precise location of each plate along the vertical may be readily noted by reading a scale such as scale 107.

As shown in FIGS. 8 and 9, alignment plates 46, 48, etc. are at heights above caul plate 82 to accommodate a mat of increasing thickness.

With respect to the actual alignment plate construction, it is to be noted that provision of hingedly interconnected segments, such as segments 56, 56a, etc., ensures that substantially parallel electric field lines will be maintained adjacent to the top of a mat being formed. As previously described, if the bottom of an alignment plate is not adjacent to the top of a mat being formed, the electric field lines will become distorted as shown in FIG. 12. However, by providing hingedly connected segments, the field lines may be extended adjacent the top portion of a mat being formed.

In applications utilizing the plate construction of the present invention, it is contemplated that the potential between adjacent plates (above the segments) may be in the range of $5-10 \times 10^3$ volts per inch. Because resistive material hingedly interconnects the segments to each alignment plate, a voltage drop will occur across such resistive material. However, sufficient charge will remain on the segments so that a defined electric field will exist between spaced-apart segments as shown in FIG. 13. This field maintains the alignment of a particle and ensures that unidirectional placement of the particles will result when the particles strike a mat being formed.

As shown in FIG. 10, if an irregular clump of material is somehow formed on a mat being produced, the segments, such as segment 56, will pivot over the clump and not gouge or score the mat. Because a plurality of segments are provided, irregularities at any location in a mat being formed will not cause gouging or scoring of the mat.

With respect to the material used to sandwich the conductive material in the alignment plates, it has been found that phenolic is particularly appropriate. Such material tends to retain a charge on its surface and is resistive at the high voltages previously mentioned. Phenolic adequately prevents arc over between the alignment plates and thus eliminates the danger of fire. Other materials which could be used include epoxy formulations filled with conductive material and polyester resin. Additionally, it has been found that if phenolic is filled with carbon, lead or copper particles, various levels of resistivity may be selectively designed.

Another advantage of the embodiment shown in FIG. 8 resides in the fact that each of the alignment plates may also be selectively tilted or inclined. For instance, as shown in FIG. 8, threaded member 130 can be rotated within nut 128 so as to incline alignment plate 46 relative to the vertical. Similarly, the other alignment plates could be so inclined.

While the invention has been particularly shown and described with reference to the foregoing preferred embodiments thereof, it will be understood by those of skill in the art that other changes in form and detail may be made therein without departing from the spirit and scope of the invention as defined in the appended claims.

What is claimed is:

1. Apparatus adapted for mounting above a conveyor and for unidirectionally aligning elongate particles generally in the direction of conveyance in the forming of a mat of particleboard comprising
    a plurality of substantially flat, spaced-apart plates of conductive material disposed substantially upright and parallel to one another and positioned generally transversely to the direction of conveyance, said plates adapted to be electrostatically charged to provide a potential difference between said plates so that the particles will experience electric field aligning forces generally parallel to the direction of conveyance as the particles pass between the plates;
    each of said plates including flexible, resistive material secured thereto which extends below a bottom edge of the plate to a region adjacent the mat being formed on the conveyor so that electric field lines between adjacent plates are maintained substantially horizontally over the plate and material height.

2. The apparatus as defined in claim 1, wherein said, controlled resistive material is a continuous curtain extending substantially the length of a plate.

3. The apparatus as defined in claim 1, wherein said, controlled resistive material includes a plurality of spaced apart strips secured to said plates.

4. Apparatus adapted for mounting above a conveyor and for unidirectionally aligning elongate particles generally in the direction of conveyance in the forming of a mat of particleboard comprising:
    a plurality of substantially flat, spaced-apart plate expanses of conductive material disposed substantially upright and parallel to one another and positioned generally transversely to the direction of conveyance, said plate expanses adapted to be electrostatically charged to provide a potential difference between the plates so that the particles will experience electric field aligning forces parallel to the direction of conveyance as the particles pass between the plates; and
    plural segments of resistive material connected adjacent to a bottom edge of said plate expanses and depending therefrom, said segments being movable relative to said plate expanses the resistive material maintains the lines of the electric field between adjacent plates substantially horizontal over the plate and material height.

5. The apparatus as defined in claim 4 wherein said plate expanses are sandwiched between resistive material.

6. The apparatus as defined in claim 4 wherein said segments include conductive material sandwiched between expanses of resistive material.

7. The apparatus as defined in claim 6 wherein said segments are hingedly connected to said plate expanses by means of flexible, resistive material.

8. The apparatus as defined in claim 4 wherein said plate expanses are mounted on a mounting assembly, said mounting assembly including adjusting means selectively operable for varying the vertical positioning of said plate expanses.

9. The apparatus as defined in claim 8 wherein said adjusting means includes a vertically shiftable plate connected to opposite ends of an associated plate expanse.

10. The apparatus as defined in claim 9 wherein said mounting assembly also includes means selectively operable for varying horizontal spacing between adjacent plate expanses.

11. Apparatus adapted for mounting above a conveyor and for unidirectionally aligning elongate particles generally in the direction of conveyance in the forming of a mat of particleboard comprising:
    a plurality of substantially flat, spaced-apart plate expanses of conductive material disposed substantially upright and parallel to one another and positioned generally transversely to the direction of conveyance, said plate expanses adapted to be electrostatically charged to provide a potential difference between the plates so that the particlas will experience electric field aligning forces generally parallel to the direction of conveyance as the particles pass between the plates; and
    a resistive material sheet connected adjacent to a bottom edge of said plate expanses and depending therefrom, said resistive material sheet being movable relative to said plate expanses the resistive material maintains the lines of the electric field between adjacent plates substantially horizontal over the plate and material height.

12. The apparatus as defined in claim 11 wherein said plate expanses are sandwiched between resistive material.

13. The apparatus as defined in claim 11 wherein said resistive material sheet includes conductive material sandwiched between expanses of resistive material.

14. The apparatus as defined in claim 13 wherein said resistive material sheet is hingedly connected to a plate expanse by means of flexible, resistive material.

15. The apparatus as defined in claim 11 wherein said plate expanses are mounted on a mounting assembly, said mounting assembly including adjusting means selectively operable for varying the vertical positioning of said plate expanses.

16. The apparatus as defined in claim 15 wherein said adjusting means includes a vertically shiftable plate connected to opposite ends of an associated plate expanse.

17. The apparatus as defined in claim 16 wherein said mounting assembly also includes means selectively operable for varying horizontal spacing between adjacent plate expanses.

* * * * *